(12) United States Patent
Roberts et al.

(10) Patent No.: US 8,358,810 B2
(45) Date of Patent: Jan. 22, 2013

(54) DIGITAL TERRAIN MAPPING WITH GPS AND LASER SYSTEM

(75) Inventors: Jonathan Michael Roberts, Toowong (AU); Graeme John Winstanley, Robertson (AU)

(73) Assignee: Commonwealth Scientific and Industrial Research Organisation (AU)

( * ) Notice: Subject to any disclaimer, the term of this patent is extended or adjusted under 35 U.S.C. 154(b) by 726 days.

(21) Appl. No.: 12/515,279

(22) PCT Filed: Oct. 4, 2007

(86) PCT No.: PCT/AU2007/001468
§ 371 (c)(1),
(2), (4) Date: May 16, 2009

(87) PCT Pub. No.: WO2008/058308
PCT Pub. Date: May 22, 2008

(65) Prior Publication Data
US 2010/0034421 A1 Feb. 11, 2010

(30) Foreign Application Priority Data
Nov. 16, 2006 (AU) ................................ 2006906418

(51) Int. Cl.
*G06K 9/00* (2006.01)
(52) U.S. Cl. .......................................................... 382/106
(58) Field of Classification Search .......... 382/100–107; 356/2–5.02, 141.1; 701/50, 116, 532; 111/200–204, 111/904–907
See application file for complete search history.

(56) References Cited

U.S. PATENT DOCUMENTS
6,108,076 A * 8/2000 Hanseder .................. 356/141.1
(Continued)

FOREIGN PATENT DOCUMENTS
JP 09-196672 A 7/1997
WO WO 2004/028134 A2 4/2004

OTHER PUBLICATIONS
David Edward Goldberg, *Genetic Algorithms in Search and Optimization*, pp. 10-15 (Addison-Wesley Pub. Co. 1989) (7 pages).
(Continued)

*Primary Examiner* — Atiba O Fitzpatrick
(74) *Attorney, Agent, or Firm* — Brinks Hofer Gilson & Lione

(57) ABSTRACT

This invention concerns digital terrain mapping, and in particular a method for producing digital terrain maps of the vicinity around large rotating machinery, such as draglines, shovels, excavators, wheel loaders or cranes. The method involves the following steps: Mounting a 2-Dimensions laser scanner and a high-accuracy RTK GPS system to an item of large rotating machinery, at a radial extremity of the machinery. Arranging the laser scanner to record radial lines of data representing the terrain below the extremity of the machinery. Rotating the machinery completely about its axis of rotation and generating data from both the laser scanner and GPS system that represents the terrain around the machinery. Wherein, a calibration is conducted by recording data from markers at known locations in the terrain below the extremity of the machinery to determine the relative positions of the laser scanner centre and the GPS antenna, the orientation of the laser scanner and the time lag between the data generated from both the laser scanner and the GPS system. In a further aspect the invention concerns equipment for use in the method and software.

12 Claims, 19 Drawing Sheets

U.S. PATENT DOCUMENTS 6,553,299 B1 * 4/2003 Keller et al. .................. 701/50
6,600,553 B1 7/2003 Stone

OTHER PUBLICATIONS

Matthew Wall, *GAlib, A C++ Library of Genetic Algorithm Components*, http://lancet.mit.edu/ga/ (1 page).

Matthew Wall, *GAlib: A C++ Library of Genetic Algorithm Components, version 2.4 Documentation Revision B* (Aug. 1996) (104 pages).

International Search Report and Written Opinion for PCT Application No. PCT/AU2007/001468, 8 pages, Dec. 10, 2007.

* cited by examiner

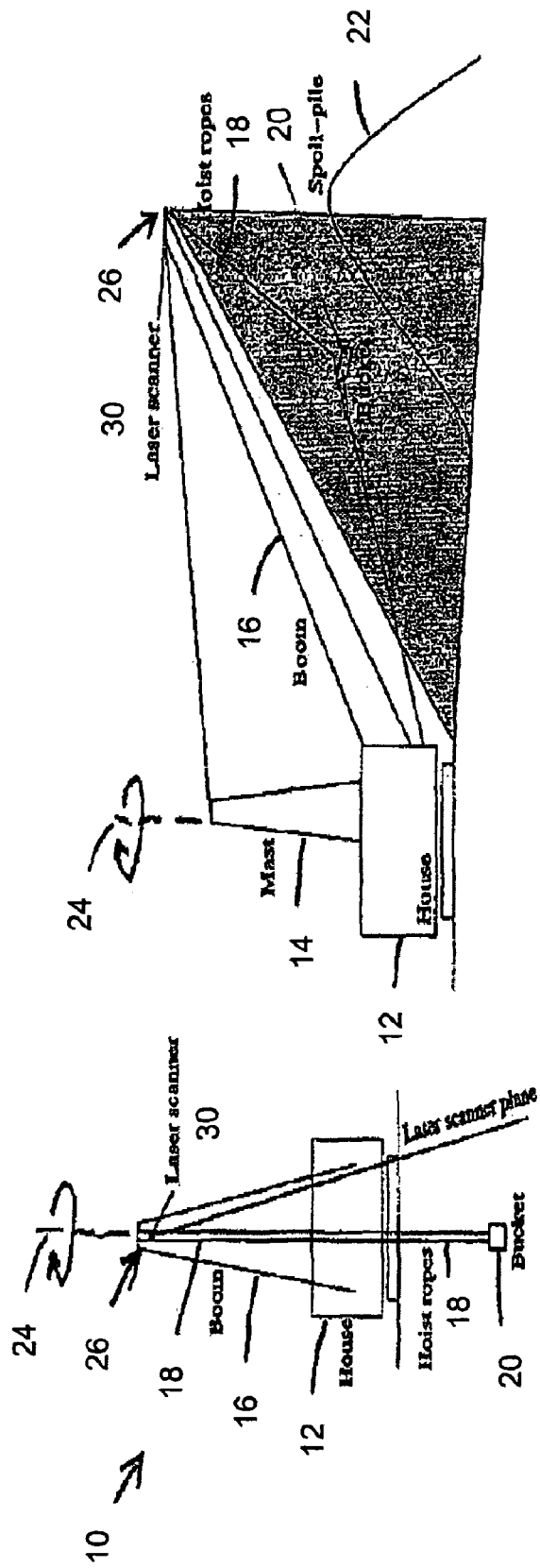

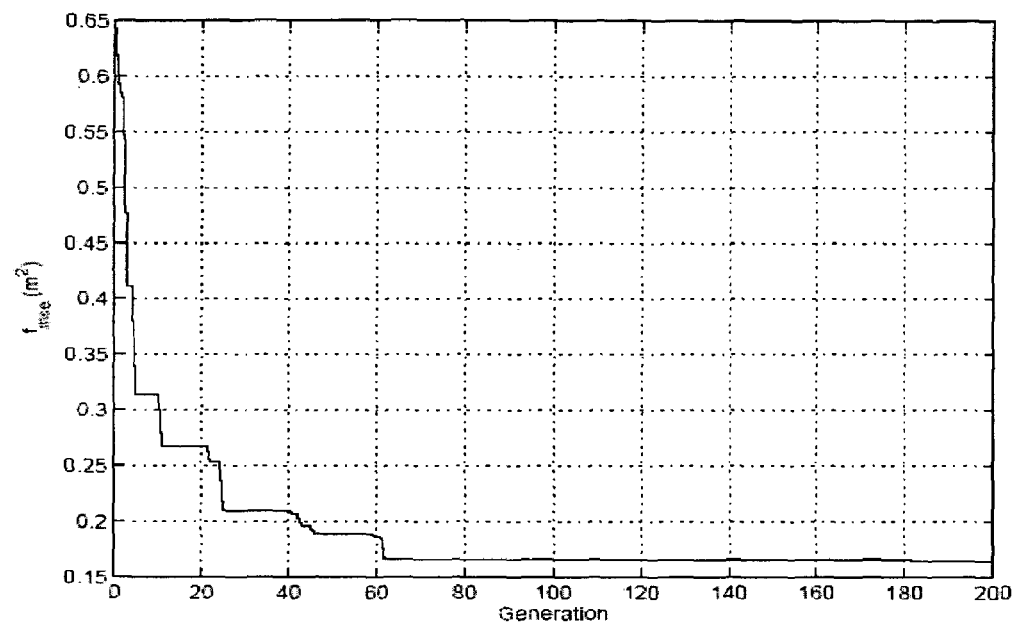
(a)
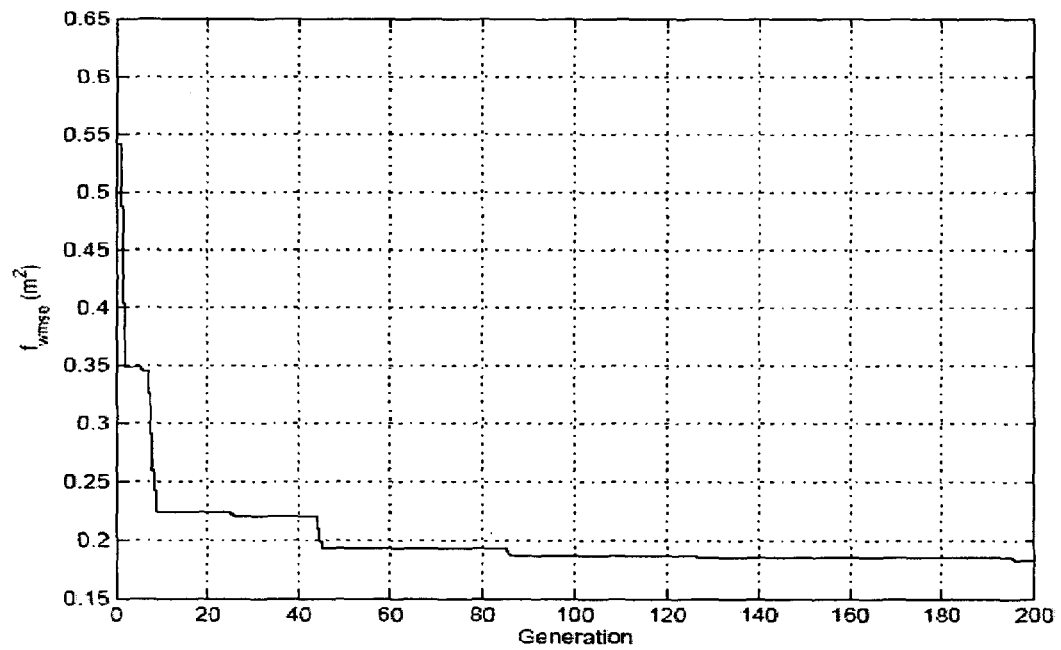
(b)
Fig. 20

DIGITAL TERRAIN MAPPING WITH GPS AND LASER SYSTEM

This application is a filing under 35 U.S.C. §371 of International Patent Application PCT/AU2007/001468, filed Oct. 4, 2007, which claims priority to Australian application no. AU 2006906418, filed Nov. 16, 2006.

TECHNICAL FIELD

This invention concerns digital terrain mapping, and in particular a method for producing digital terrain maps of the vicinity around large rotating machinery, such as draglines, shovels, excavators, wheel loaders or cranes. In a further aspect the invention concerns equipment for use in the method, and software.

BACKGROUND ART

It is generally desirable to construct digital terrain maps of the vicinity around large equipment such as draglines. These maps can be used to measure the location and volume of material, locate objects and avoid collision during operation. There are a number of factors that lead to such maps lacking precision.

DISCLOSURE OF THE INVENTION

The invention is a method for producing digital terrain maps of the vicinity around large rotating machinery, the method comprising the following steps:
  Mounting a 2-Dimensions laser scanner and a high-accuracy RTK GPS system to an item of large rotating machinery, at a radial extremity of the machinery.
  Arranging the laser scanner to record radial lines of data representing the terrain below the extremity of the machinery.
  Rotating the machinery completely about its axis of rotation and generating data from both the laser scanner and GPS system that represents the terrain around the machinery.
  Wherein, a calibration is conducted by recording data from markers at known locations in the terrain below the extremity of the machinery to determine the relative positions of the laser scanner centre and the GPS antenna, the orientation of the laser scanner and the time lag between the data generated from both the laser scanner and the GPS system.

As a result of the calibration the digital terrain map may be constructed with great accuracy, for instance +/−0.2 m.

In particular seven offsets may be determined by the calibration step:
  The distance from the GPS antenna to laser scanner centre, that is x, y and z offsets, in total three values.
  The installed roll, pitch and yaw angles of the laser scanner assembly with respect to the dragline, another three values. And,
  The time lag between the GPS and laser scanning sensors.
  A number of calibrations may be made to check system stability over time.

A plurality of markers may be used, and a GPS antenna may be placed on top of each marker and the Easting, Northing and Altitude is recorded.

The 2D position of the survey posts as surveyed may be aligned with the corresponding data estimated by the digital terrain mapping system using an Iterative Closest Point (ICP) algorithm.

The seven offsets determined by the calibration step may be optimised using a Genetic Algorithm, bundle adjustment or any other suitable technique.

The data generated by both the laser scanner and GPS system while the machinery is rotated may be time stamped. In particular the position of the GPS antenna may be calculated at the time reported by the laser scanner.

In a further aspect the invention is equipment for use in the method, the equipment comprises: A 2D laser scanner and a high-accuracy RTK GPS system mounted together in a fixed relationship to each other and together with mounting means to mount the equipment on an extremity of an item of large rotating machinery.

The equipment may also include an embedded PC to interface with both the laser and GPS systems and to store data and generate terrain maps.

The laser may have a 60 degree field-of-view. The mounting means may be designed to orient the laser downward with a slight tilt to avoid sighting any cables that hang down from adjacent the mounting point.

The GPS system may return its position in 3D space with 2 cm precision.

The equipment may be used to construct digital terrain maps while the large rotating machinery rotates in use.

The maps produced may be loaded into planning or design software.

A visualisation tool may be provided for the operator of the large rotating machinery, so that they may view the terrain around the machinery from any angle.

The maps may be integrated into the Automatic Control System of the large rotating machinery.

BRIEF DESCRIPTION OF THE DRAWINGS

An example of the invention will now be described with reference to the accompanying drawings, in which:
FIG. 1 is a diagram of the Digital Terrain Mapping (DTM) system.
FIG. 2 is an elevation of the DTM system.

FIG. 20(a) is a plot showing the convergence of the fitness function $f_{mse}$ during the GA runs FIG. 20(b) is a plot showing the convergence of the fitness function $f_{wmse}$ during the GA runs

BEST MODES OF THE INVENTION

Figure 3:
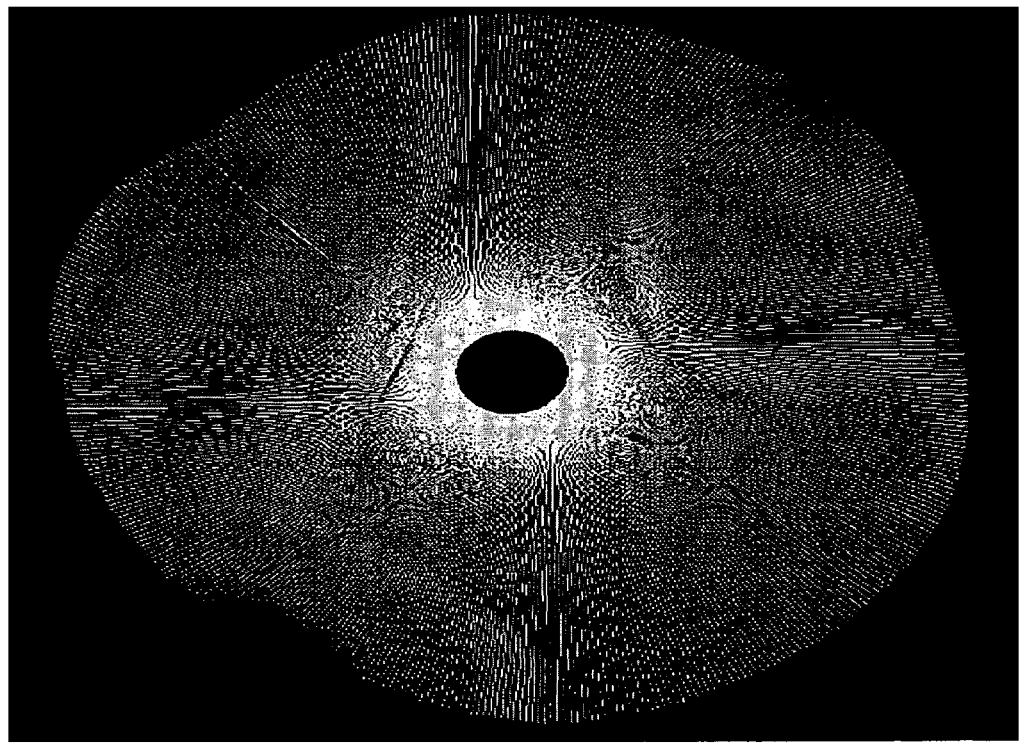
FIG. 3 is an image of raw laser scanner data.

Referring first to FIGS. 1 and 2, earthmoving equipment 10, a dragline, comprises a house 12, a mast 14 and a boom 16. Hoist ropes 18 carry a bucket 20, and the equipment operates to use the bucket 20 to move spoil from the pile 22. In order to do this the entire dragline rotates about a vertical axis indicated at 24.

Figure 15:
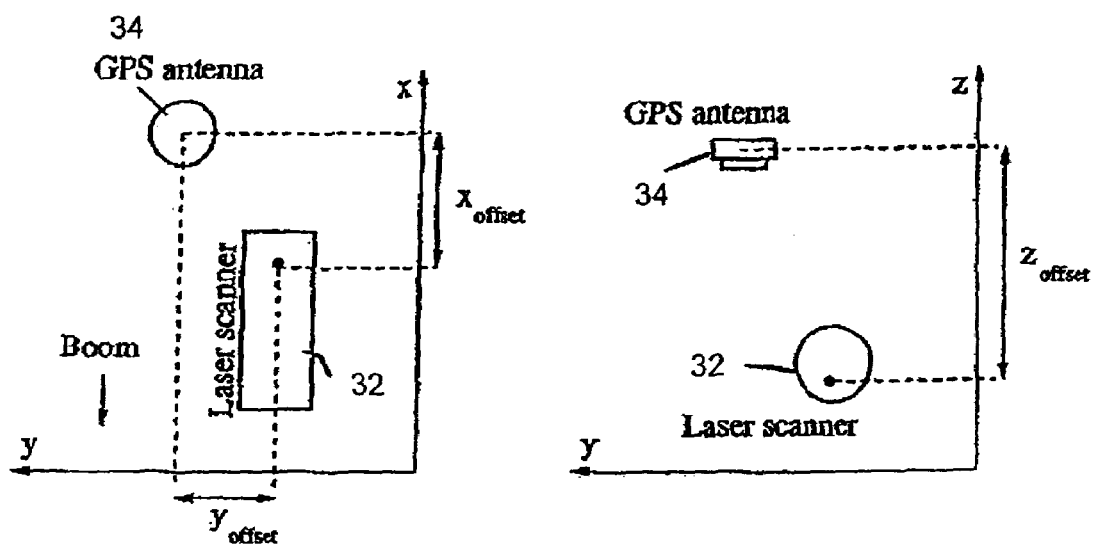
FIG. 15 is a diagram of the translation offsets between the GPS antenna and the laser scanner's scanning centre.

A digital terrain mapping (DTM) system 30 is mounted on the dragline 10, at the boom tip 26. The DTM 30 comprises three main elements, all mounted at boom tip 26:

A 2D laser scanner 32 having a 60 degree field-of-view, whose scanning plane is set to be almost underneath the dragline's boom; see FIG. 15. It is tilted slightly to one side to avoid the laser imaging the bucket 20 and ropes 18. It is the laser scanner that images the ground profile.

A high-accuracy real-time kinematic (RTK) global positioning system (GPS) 34 which returns its position in 3D space with 2 cm precision; see FIG. 15.

An embedded PC used to interface with the laser and the GPS system to store data and generate the terrain maps.

The DTM system 30 constructs maps while the dragline rotates around its centre axis 24. This produces a data set containing many single lines of scan data. FIG. 3 shows the data from a complete 360 degree spin. The radial lines each comprise a complete 2D scan from the laser. The laser 32 operates at 10 Hz, which means it outputs ten complete scans per second. In order to make a digital terrain map the data produced by the laser scanner 32 must be "stitched" together. This is done using the position data reported by the RTK GPS system 34 mounted alongside the laser scanner. The relative position and angles of the laser scanner with respect to the dragline are not known with any degree of accuracy as it is not possible to measure them easily. These values can however be estimated with any accuracy by performing a system calibration. The seven unknowns to be determined from calibration are:

The distance from the GPS antenna to laser scanner centre, that is x, y and z offsets, in total three values.

The installed roll, pitch and yaw angles of the laser scanner assembly with respect to the dragline, another three values. And, The time lag between the GPS and laser scanning sensors.

The seven unknowns are referred to collectively as "offsets".

Calibration takes place after the DTM system 30 is installed on the dragline. The values of the offsets estimated by the calibration procedure are physical constants and should not change. However, if the system is physically disturbed by maintenance for example, then a new calibration would be required. A number of calibrations may be made to check system stability over time.

The calibration process involves placing markers around the dragline 10 and surveying the position of these markers using RTK GPS. The targets consist of 40×40 cm flat plates of aluminium covered in retro-reflective tape. The laser scanner can easily see the targets as they have a very high reflectivity as reported on the laser's intensity channel. The targets should be placed around the dragline, within the boom radius distance, that is no further out than the boom tip. Twenty to thirty targets are used, and they are placed on top of star-pickets. A GPS antenna is placed on top of each target and the Easting, Northing and Altitude is recorded.

The dragline is then swung over the markers and a set of calibration data collected. A calibration algorithm is then run offline on the calibration data, with the output of this algorithm being estimates of the seven offsets.

Figure 4:
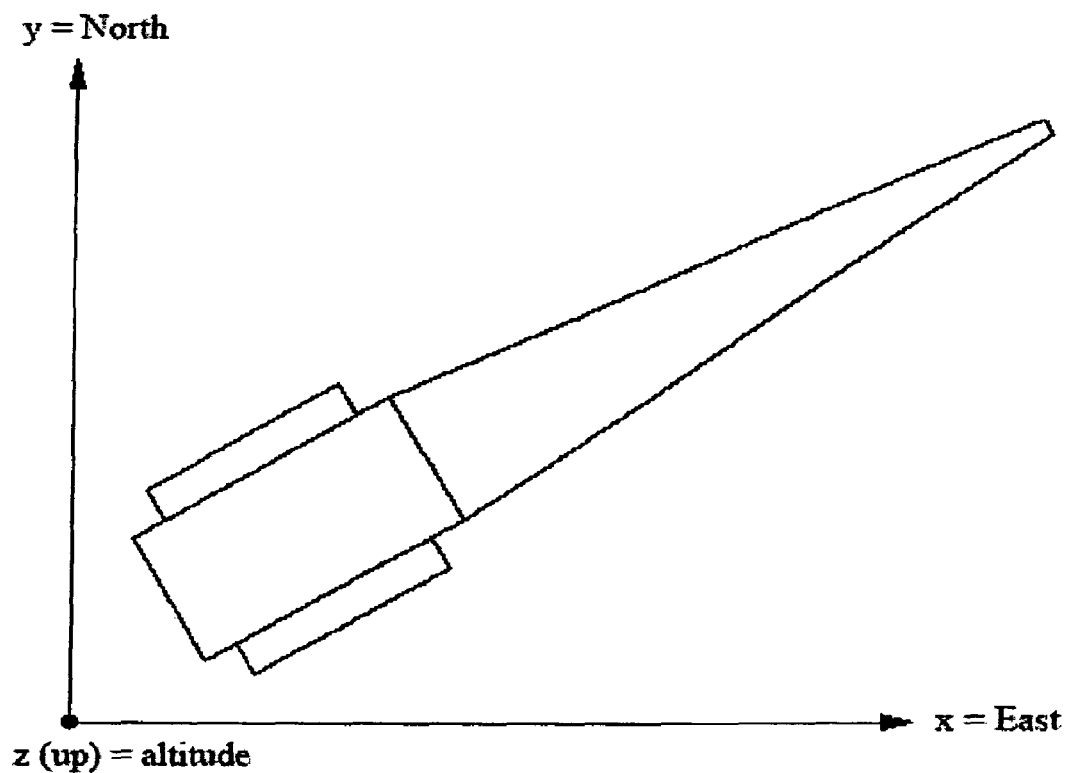
FIG. 4 is a diagram of the DTM co-ordinate system

A right handed co-ordinate system is chosen for the DTM system 30, with the x-axis lining up in the Easterly direction, the y-axis in the Northerly direction and z-axis with altitude; see FIG. 4. When the dragline boom is pointing due-East, the dragline is said to have a zero swing angle. A due-North pointing boom is 90 degrees, etc.

The aim of a calibration survey is to create a terrain map that contains identifiable features which have a precisely known location. Since the laser scanner is capable of returning the intensity of a point as well as its range, retro-reflective tape is placed on top of the 40×40 cm targets in order to make automatic feature extraction easier.

Figure 5:
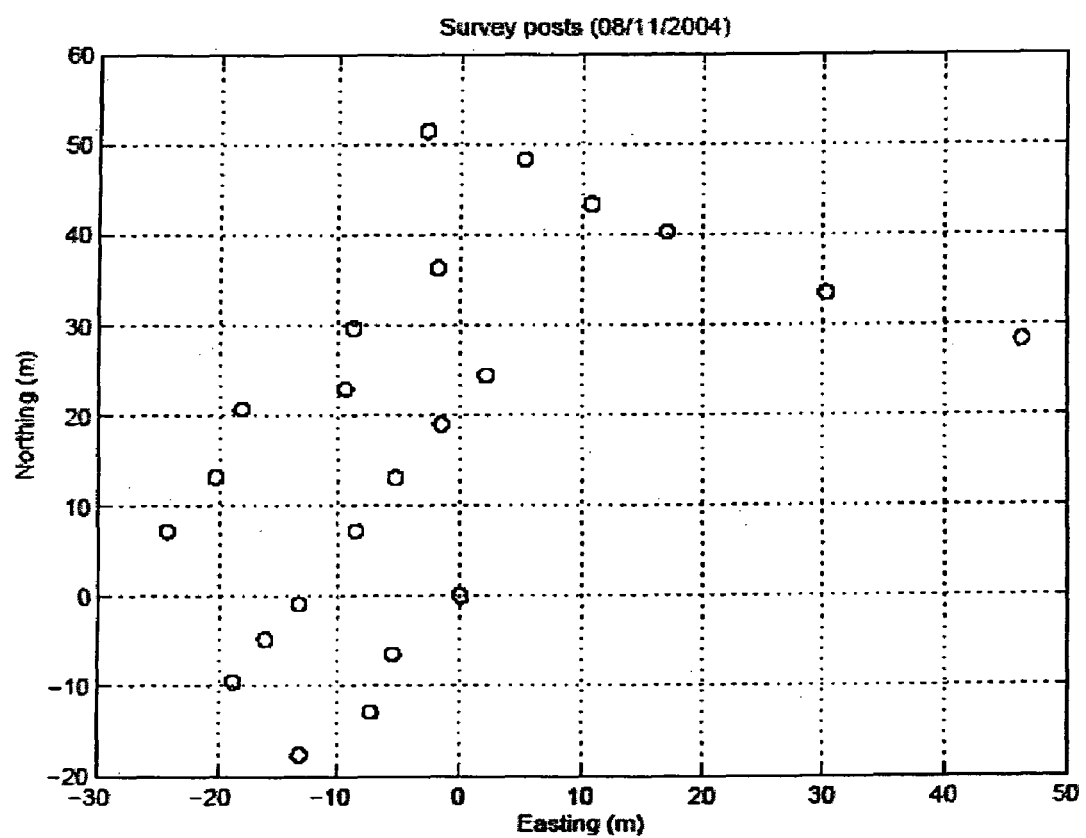
FIG. 5 is a plot of survey data from 23 posts.

In one calibration survey twenty three survey posts (markers) were placed around the dragline, in positions that lie under the boom when the dragline rotates. The position of each post was then surveyed using an RTK GPS survey system similar to that installed at boom tip. The survey data from the twenty three post survey is shown in FIG. 5. The entire survey operation took approximately one hour to complete.

Figure 6:
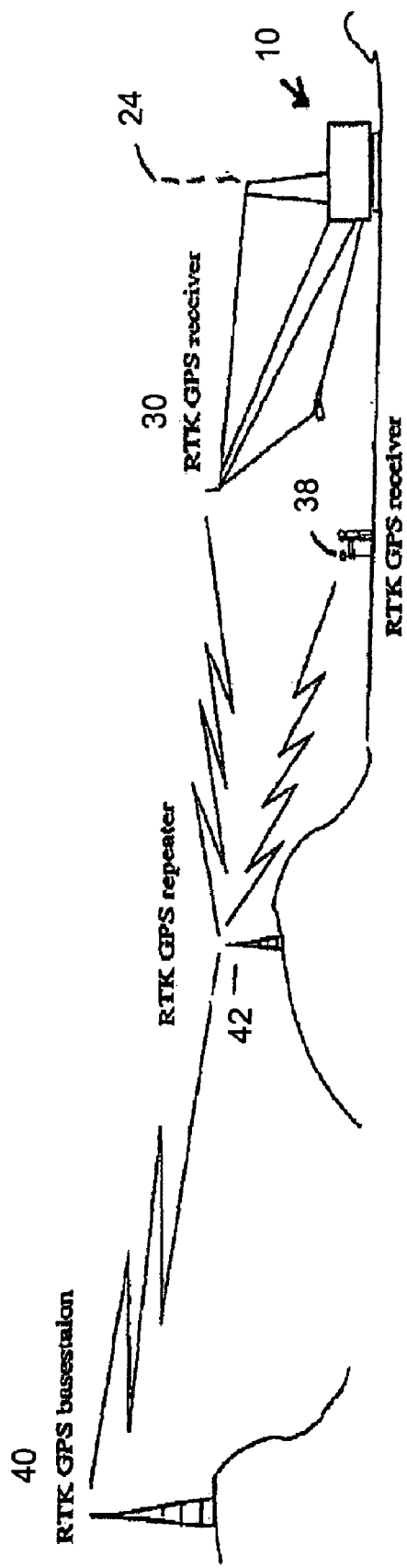
FIG. 6 is a diagram showing typical positioning of the RTK GPS base station, receivers and a repeater.

During a calibration survey the high-accuracy RTK GPS system 34 mounted at boom tip receives a correction signal transmitted from an RTK GPS basestation 40 that may be several kilometers distant from the dragline. A repeater 42 mounted on high ground overlooking the survey sight, and in line of sight of the boom tip and feature targets, might also be required; see FIG. 6.

The procedure for generating the digital terrain map used for calibration consists of the following steps:

Swinging the dragline 10 around axis 24 over the surveyed targets 38 and collecting calibration data from the laser scanner 32.

Interpolating the position and orientation of the laser scanner 32 from the position data from the RTK GPS system 34.

Generating a point cloud type digital terrain map using the laser scanner data and the interpolated position and orientation data.

There are two sources of possible error. First, the laser scanner 32 and GPS system 34 are not synchronised, and second the RTK GPS system can only report the x, y and z position and does not provide orientation information directly.

Figure 7:
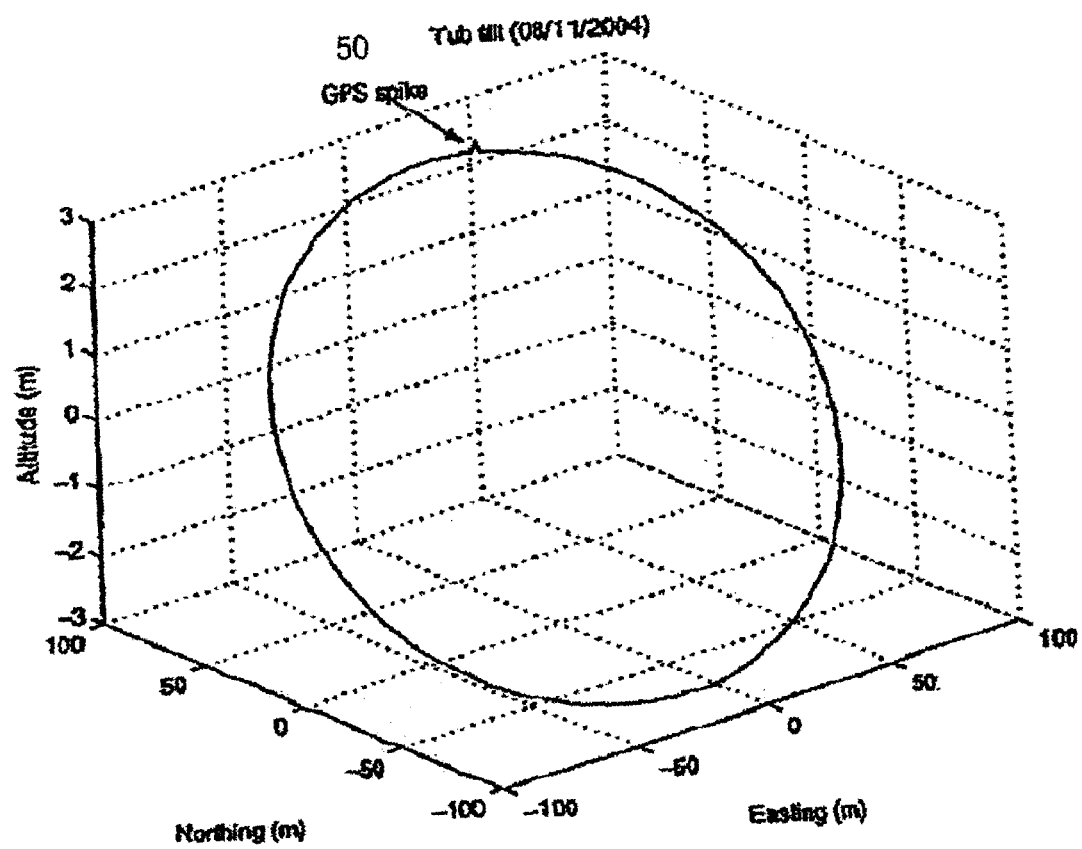
FIG. 7 is a plot of the position of the RTK GPS antenna during a calibration swing.
Figure 8A:
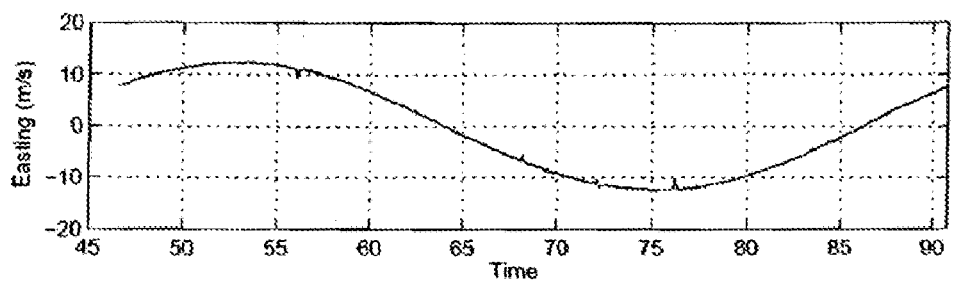
FIG. 8(a) is a plot of the easting variation of the DTM system during a calibration swing.
Figure 8B:
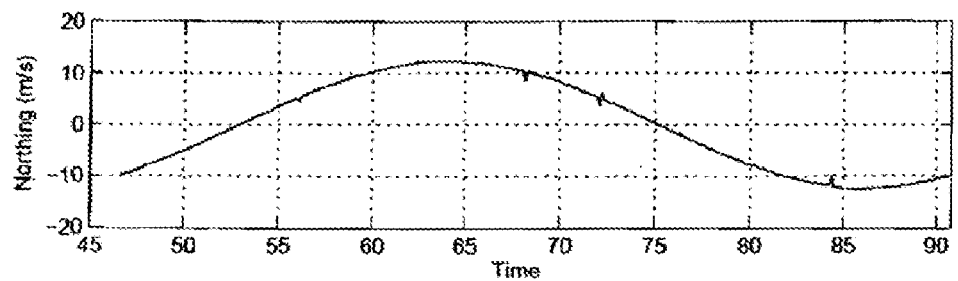
FIG. 8(b) is a plot of the northing variation of the DTM system during a calibration swing.
Figure 8C:
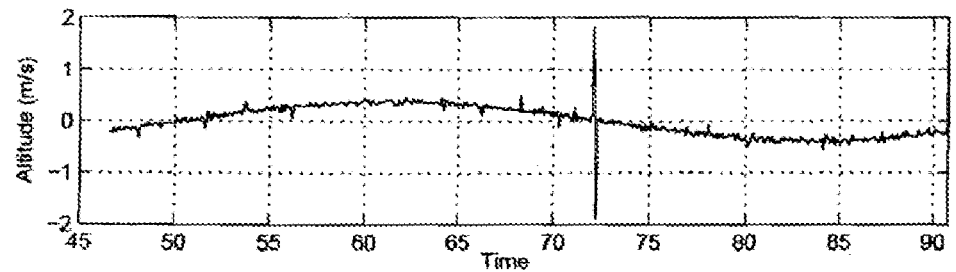
FIG. 8(c) is a plot of the altitude variation of the DTM system during a calibration swing.
Figure 8D:
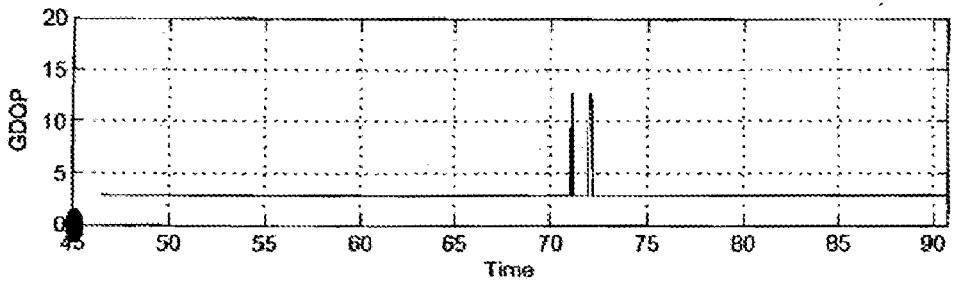
FIG. 8(d) is a plot of the GODP signal during a calibration swing with respect to the easting, northing and altitude in FIGS. 8(a)-(c).

FIG. 7 shows a 3D plot of the RTK GPS position during one complete calibration swing. The figure shows that the boom tip moves through a circular path that is tilted with respect to horizontal. FIG. 7 also shows a spike 50 at the top of the tilted circle, and this likely arises from difficulty in obtaining RTK GPS lock just prior to collecting this data.

FIGS. 8 (*a*), (*b*) and (*c*) show the velocities in the three directions: easting, northing and altitude respectively. These velocities were calculated by differentiating the position data from the RTK GPS system. The graphs show a number of small spikes in all three directions with a very large spike in the altitude signal at about the 72 second mark. FIG. 8 (*d*) shows the so-called Geometric Dilution Of Precision (GDOP) which is a measure of the overall uncertainty in a GPS position solution. The lower the GDOP, the better. It is clear that the GDOP increases significantly at the 72 second mark and coincides with the spike in altitude. The spikes associated with an increase in GDOP can be easily filtered out. A GDOP threshold value of 5.0 is used, and any data with a reported GDOP value greater than this threshold is ignored. No attempt has been made to filter out the data associated with the smaller spikes at this stage.

Figure 9:
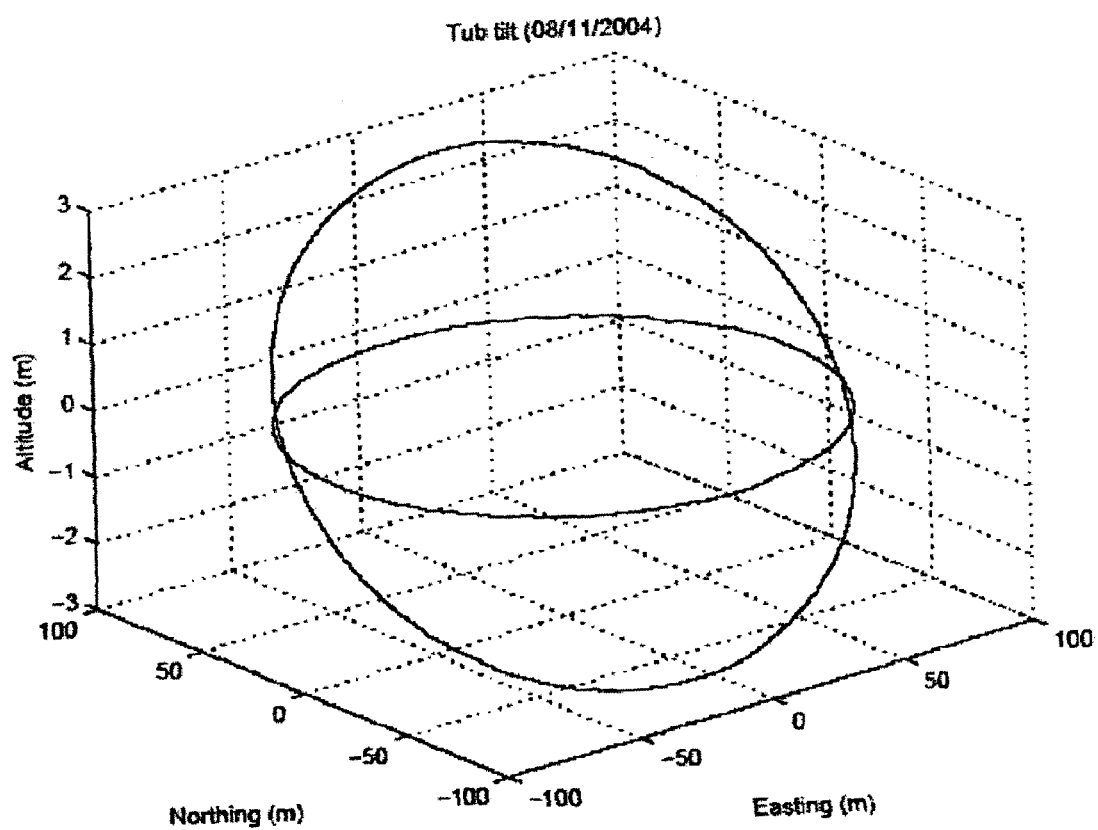
FIG. 9 is a plot of the original tilted circle of a calibration swing and a horizontal circle created for interpolation.

As seen in FIG. 9 the circle that the boom tip moves through in 3D space is significantly tilted with respect to the horizontal. This implies that the laser scanner will also be tilted as it rotates with the boom tip. The associated change in roll and pitch angles must be taken into account when generating the digital terrain map. A simple way to calculate the roll and pitch angles is to find the roll and pitch angles of a best-fit plane through the circle data. This can be done by using a standard plane fitting technique such as the minimisation of the sum of the squared errors. This algorithm finds the coefficients of the plane equation z=Ax+By +C. The tub roll (rotation about the x-axis) angle ($\phi_{tub}$) and the tub pitch (rotation about the y-axis) angle ($\theta_{tub}$) are then given by the following equations:

$$\phi_{tub} = \arctan(B), \theta_{tub} = -\arctan(A) \quad (1)$$

Fitting a plane using the above method to the data shown in FIG. 9 (with the GPS spike removed) gives tilt angles of −1.66 degrees for roll and 0.63 degrees for pitch. Although 1.66 degrees seems small, it translates to a 2.5 m height difference at boom tip.

Because the laser scanner and GPS system are not synchronised, the position of the laser scanner when each scan was taken must be interpolated from the GPS data. Both the laser scanner data and the GPS data are time-stamped by the logging computer when received. This timing data allows the position of the laser scanner to be estimated. The procedure developed is based on the speed of rotation of the boom tip around the circle. What we actually calculate is the position of the GPS antenna at the time reported by the laser scanner. The procedure developed is as follows:

First, re-calculate the 3D GPS with respect to the centre of the circle of rotation. Note that this point is calculated as the mid-point between the $x_{GPS}$, $y_{GPS}$ and $z_{GPS}$ extremes and not the mean of the $x_{GPS}$, $y_{GPS}$ and $z_{GPS}$ data. The co-ordinates of the centre of rotation are given by ($x_c$, $y_c$, $z_c$) and so each GPS point is translated as follows:

$$\begin{bmatrix} x'_{GPS} \\ y'_{GPS} \\ z'_{GPS} \end{bmatrix} = \begin{bmatrix} x_{GPS} \\ y_{GPS} \\ z_{GPS} \end{bmatrix} - \begin{bmatrix} x_c \\ y_c \\ z_c \end{bmatrix} \quad (2)$$

Secondly, the now centered 3D GPS data is rotated in order to make it appear horizontal, that is roll it $-\phi_{tub}$ degrees and pitch it $-\theta_{tub}$, degrees, as follows:

$$\begin{bmatrix} x_h \\ y_h \\ z_h \end{bmatrix} = Rot(x, -\phi_{tub})Rot(y, -\theta_{tub}) \begin{bmatrix} x'_{GPS} \\ y'_{GPS} \\ z'_{GPS} \end{bmatrix} \quad (3)$$

This results in a horizontal circle 60 as shown in FIG. 9.

Figure 10:
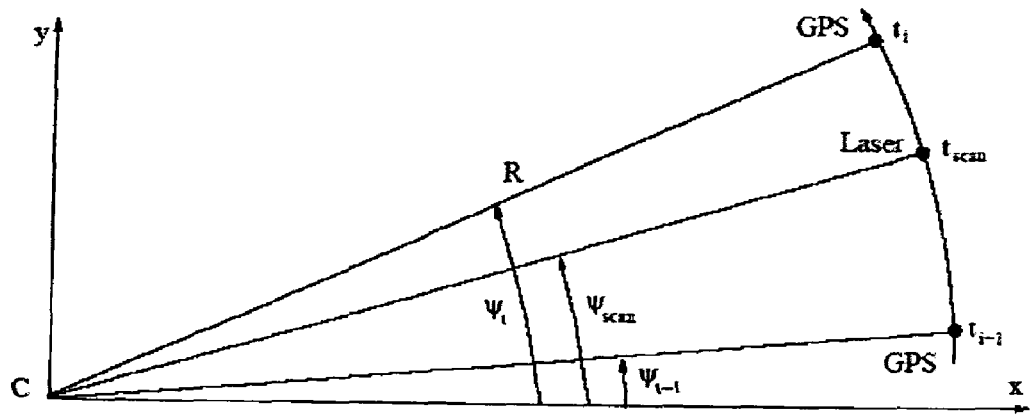
FIG. 10 is a diagram of laser position interpolation between GPS data.

Third, for each laser scan and using the time that the scan was logged (at time $t_0$), the RTK GPS position logged just before the scan (at time $t_{-1}$) is found, and the GPS position logged just after the scan (at time $t_1$) is found, see FIG. 10. For each rotated GPS data point, the yaw angle ($\Psi_i$) from the centre of the circle to the rotated GPS data point is then calculated as follows:

$$\Psi_i = \arctan\left(\frac{y_{h_i}}{x_{h_i}}\right) \quad (4)$$

It is assumed that the boom tip moves with constant velocity between the successive GPS data points and so the yaw rate, $\dot{\Psi}$, is calculated as follows:

$$\dot{\Psi}_i = \frac{\Psi_i - \Psi_{i-1}}{t_1 - t_{i-1}} \quad (5)$$

The yaw angle ($\Psi_{scan}$) at the laser scanner time ($t_{scan}$) is calculated as follows:

$$\Psi_{scan} = \Psi_{i-1} + \left(\frac{t_{scan} - t_{i-1}}{t_i - t_{i-1}} - \Delta t\right)\dot{\Psi}_i \quad (6)$$

where $\Delta t$ is a constant value that represents the time lag between the sensors obtaining their data and the logging computer receiving the data. A single $\Delta t$ value represents both GPS and laser scanner sensor-to-computer lag. Note that $\Delta t$ is one of the unknown parameters that must be estimated at the end of the calibration process.

Fourth, for each laser scan (given the yaw angle $\Psi_{scan}$) calculate the corresponding Cartesian position ($x_0$, $y_0$, $z_0$). The values for $x_0$ and $y_0$ are calculated as follows:

$$x_0 = R\cos(\Psi_{scan}), y_0 = R\sin(\Psi_{scan}) \quad (7)$$

where R is the radius of the circle and is calculated as follows:

$$R = \frac{\sum_{i=1}^{m} \sqrt{x_{h_i}^2 + y_{h_i}^2}}{m} \quad (8)$$

Note that for the set of data considered here, R was calculated to be 87.05 m. According to the dragline's operating manual, the dump radius is 87 m.

Figure 11:
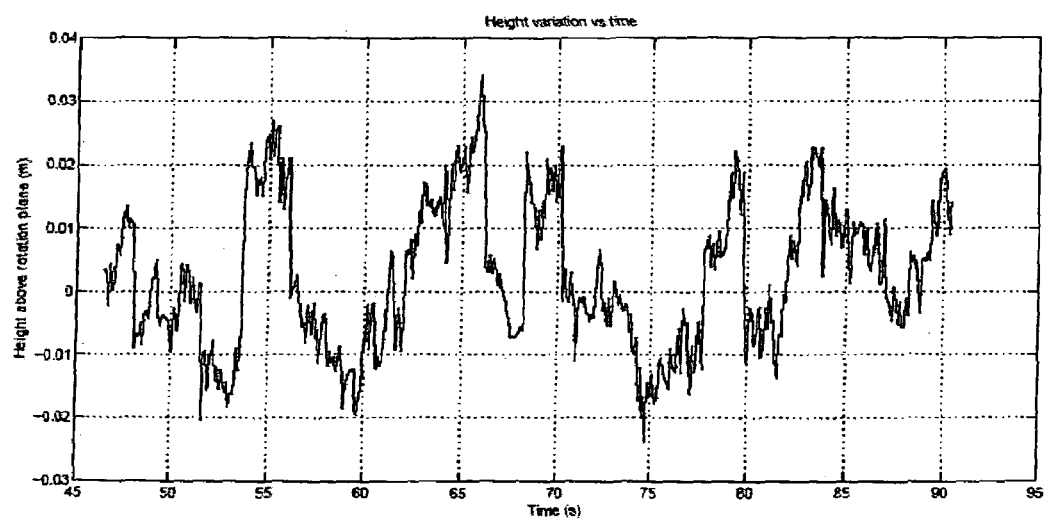
FIG. 11 is a plot of the height of the GPS antenna above the horizontal circle of FIG. 9.

Fifth, for each laser scan calculate the corresponding z Cartesian height. Because we are working with a 2D rotation disc, it would be expected that the height above the disc ($Z_h$) would be zero. FIG. 11 shows how the height above the 2D disc changed over time for a complete calibration swing. The accuracy of the RTK GPS system is claimed to be of the order of 2 cm and so it is clear from FIG. 11 that the height variation is more than just sensor noise (which is probably the high frequency component clearly visible during the swing). The larger general changes in height are probably real and are likely to be caused by the motion of the bucket and ropes.

In order to calculate the z position for the laser scan, it is assumed that the height varies with constant velocity between GPS data. The value of $z_0$ is therefore calculated as follows:

$$z_0 = z_{h_{-1}} + (z_{h_1} - z_{h_{-1}})\left(\frac{t_0 - t_{-1}}{t_1 - t_{-1}}\right) \quad (9)$$

Sixth, for each laser scan rotate the position in the 2D disc ($x_0$, $y_0$, $z_0$) by the tub tilt angles ($\Phi_{tub}$ and $\theta_{tub}$) to put the position back onto the tilted plane and then add the centre offset values to get the final position ($x_{scan}$, $y_{scan}$, $z_{scan}$):

$$\begin{bmatrix} x_{scan} \\ y_{scan} \\ z_{scan} \end{bmatrix} = Rot(y, \theta_{tub})Rot(x, \phi_{tub}) \begin{bmatrix} x_0 \\ y_0 \\ z_0 \end{bmatrix} + \begin{bmatrix} x_c \\ y_c \\ z_c \end{bmatrix} \quad (10)$$

A point cloud DTM can be generated using the laser scanner data and the interpolated position and orientation data calculated. The steps performed on each data point from every laser scan are detailed in the following:

Some points in the scan data should not be used for the following reasons:

No return—could be due to laser beam hitting absorbing material, material that reflects the beam away, not hitting material within range of the laser, etc. These points may be culled and can be identified by the zero value of the returned intensity pulse from the laser scanner and by their zero range return value.

Early return—could be due to insects, rain, etc. These points may be culled by rejecting points that are closer than a minimum distance threshold (for instance a value of 10 m).

Figure 12:
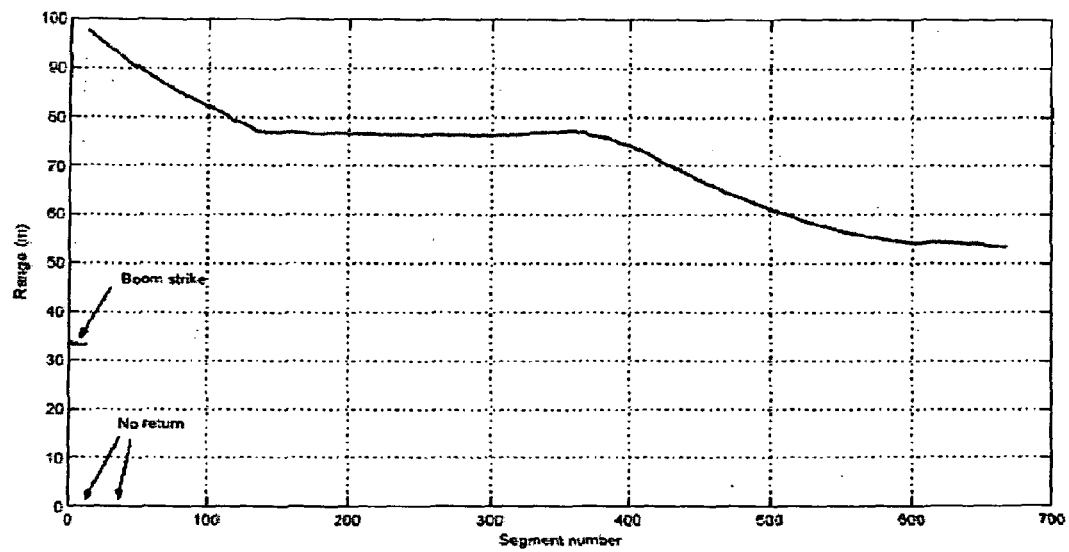
FIG. 12 is a raw laser scan showing boom strikes and "no return" data.

Boom strike—due to the laser scanner being tilted too far back towards the boom and the first segments of a scan hitting the boom structure. These points may be culled by plotting a single scan from the laser scanner and noting which segments strike the boom; see FIG. 12. All data from these segments can then be culled. Note that segments 0 to 12 hit the boom structure (this corresponds to just over 1 degree).

Figure 13:
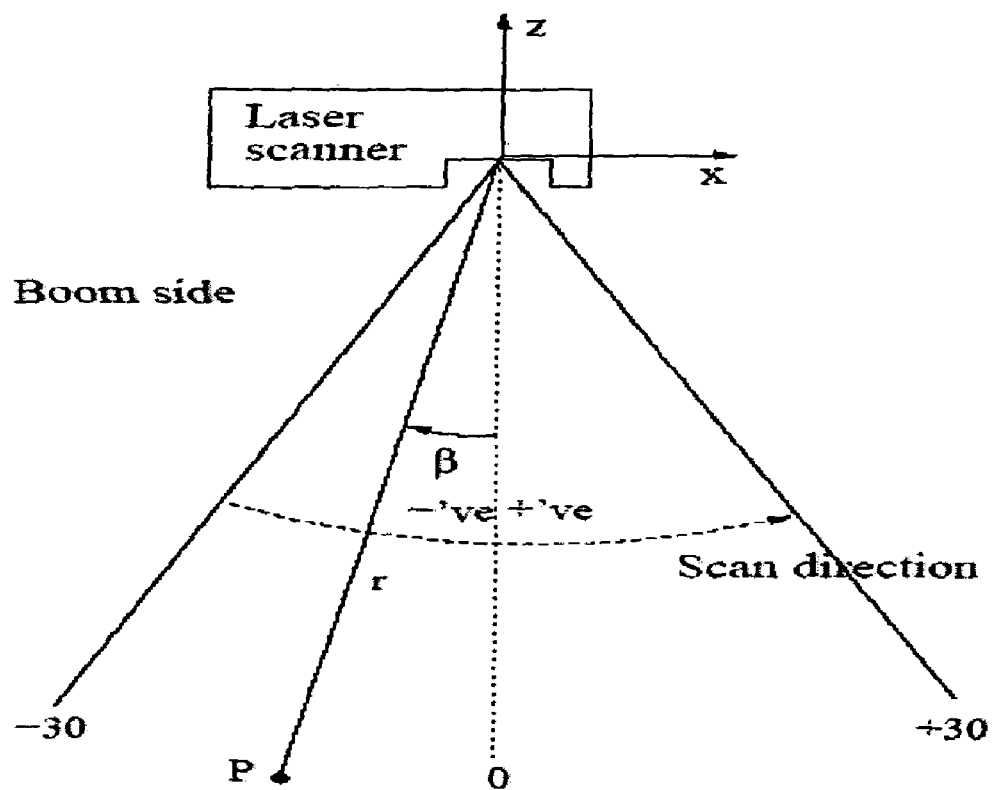
FIG. 13 is a diagram of the laser scanner co-ordinate system.

The laser scanner outputs data in a polar form, range r, and bearing β. Referring to FIG. 13, a point P's Cartesian co-ordinates ($x_l$, $y_l$, $z_l$) are therefore given by:

$$x_l = r \sin \beta, \; y_l = 0, \; z_l = -r \cos \beta \quad (11)$$

Note the laser scanner co-ordinate system given in FIG. 13 means that the y values are zero, i.e. the scanning plane is in the xz-plane of the laser scanner and that the z-values are always negative (pointing towards the ground).

The laser is mounted at the boom tip with a significant roll (about its x-axis) of approximately 7 degrees (positive in value, which is off to the left of the boom when looking from the dragline out). A value of 7 degrees was chosen as this moves the scanning plane approximately 7 m off the centre line of the boom and thus gives a reasonable chance of the laser plane clearing the bucket and ropes. However, the value of 7 degrees could only be approximated during installation and hence this roll angle (the roll offset, $\phi_{offset}$) is one of the calibration offsets. The laser is also tilted in pitch (about its y-axis). The pitch angle is controlled using a servo mechanism and can be changed via the logging computer. Changing the pitch angle allows digital terrain maps to be made at different radii from the dragline. In this work we tilted the laser back approximately 30 degrees towards the boom (a positive pitch about the y-axis). The laser has a 60 degree field-of-view, so a 30 degree pitch puts the laser scanner in a position to map the terrain from the boom tip back to the tub (FIG. 1). The pitch tilt value, $\theta_{servo}$, from the servo unit is readable by the logging computer and is therefore used for the calibration. However, this angle is the relative angle between the servo unit and the laser scanner and does not measure the angle between the laser scanner and vertical. A second offset (the pitch offset, $\theta_{offset}$) is therefore required to estimate the unknown pitch angle.

The way in which the laser scanner is mounted determines in which order the rotations need to be applied. For instance, the dragline may roll the laser scanner first and then pitch it. The rotation is therefore performed on the point P, given by ($x_l$, $y_l$, $z_l$), and resulting in a point P' as follows:

$$\begin{bmatrix} x'_l \\ y'_l \\ z'_l \end{bmatrix} = Rot(y, \theta_{servo} + \theta_{offset})Rot(x, \phi_{offset}) \begin{bmatrix} x_l \\ y_l \\ z_l \end{bmatrix} \quad (12)$$

Figure 14:
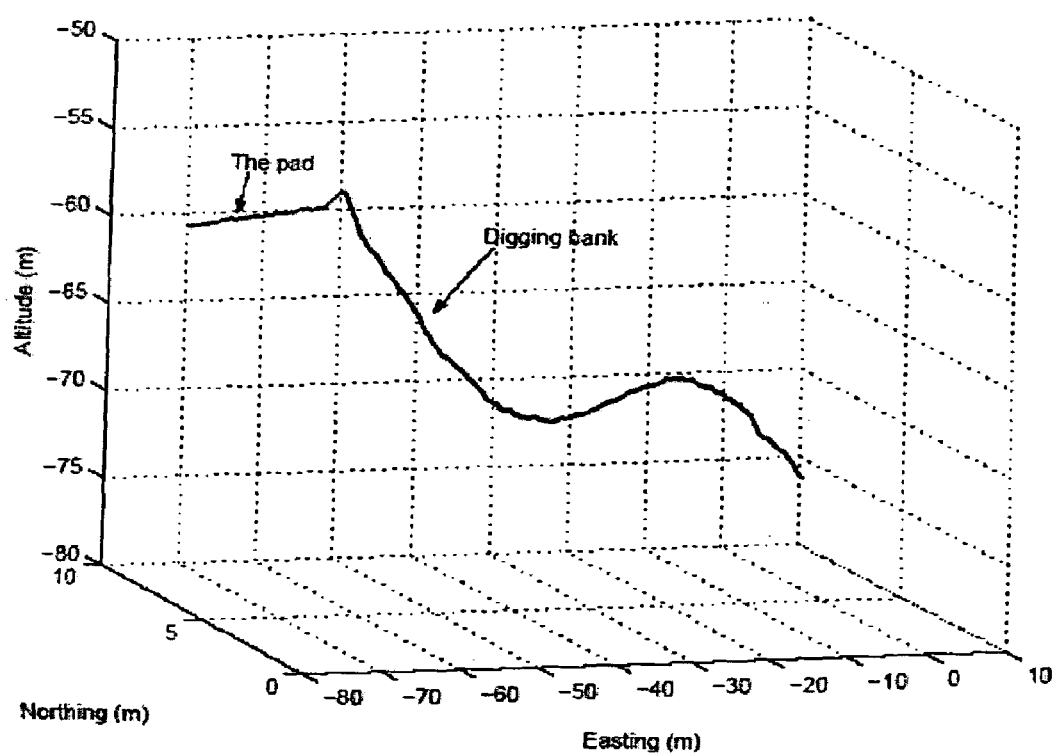
FIG. 14 is a single rotated laser scan showing a pad and bank.

FIG. 14 shows the result of the above rotations on a single laser scan. For this example, a value of 7 degrees was used for $\phi_{offset}$, 0 for $\theta_{offset}$, and 23.5 degrees for the $\theta_{servo}$. The single laser scan represents a slice through the terrain with the flat pad clearly visible to the left and the digging bank moving down into the pit.

The position of the laser scanner 32 in 3D space is measured using the RTK GPS system 34. However, the RTK GPS system 34 measures the position of the GPS antenna. The GPS antenna is mounted above the laser scanner on the boom tip handrail while the laser scanner 32 is mounted underneath the boom tip walkway floor. There are three offset values ($x_{offset}$, $y_{offset}$, $z_{offset}$) that specify the offset of the laser scanner's centre to the GPS antenna; see FIG. 15. The next stage of the process is therefore to translate the laser scan data P' by the translation offset amounts to give P*, given by ($x_l^*$, $y_l^*$, $z_l^*$). This if done as follows:

$$\begin{bmatrix} x_l^* \\ y_l^* \\ z_l^* \end{bmatrix} = \begin{bmatrix} x_{offset} \\ y_{offset} \\ z_{offset} \end{bmatrix} + \begin{bmatrix} x'_l \\ y'_l \\ z'_l \end{bmatrix} \quad (13)$$

The final stage is to transform the laser data (point P*) into the final mine co-ordinate system. The interpolated position and orientation of the laser scanner was found above. The laser scanner data must therefore be rotated by the scans orientation and translated by its position. The order of rotation is dictated by the geometry, and is yaw first, then pitch then roll. The complete transform is as follows:

$$\begin{bmatrix} x \\ y \\ z \end{bmatrix} = Rot(x, \phi_{tub})Rot(y, \theta_{tub})Rot(z, \Psi_{scan} + \Psi_{offset}) \begin{bmatrix} x_l^* \\ y_l^* \\ z_l^* \end{bmatrix} + \begin{bmatrix} x_{scan} \\ y_{scan} \\ z_{scan} \end{bmatrix} \quad (14)$$

Note that the yaw rotation has an extra component added to the $\Psi_{scan}$ value. This is the yaw offset, $\Psi_{offset}$, and represents the unknown yaw angle offset of the laser scanner with respect to the boom. This offset angle is small but extremely significant.

Figure 16:
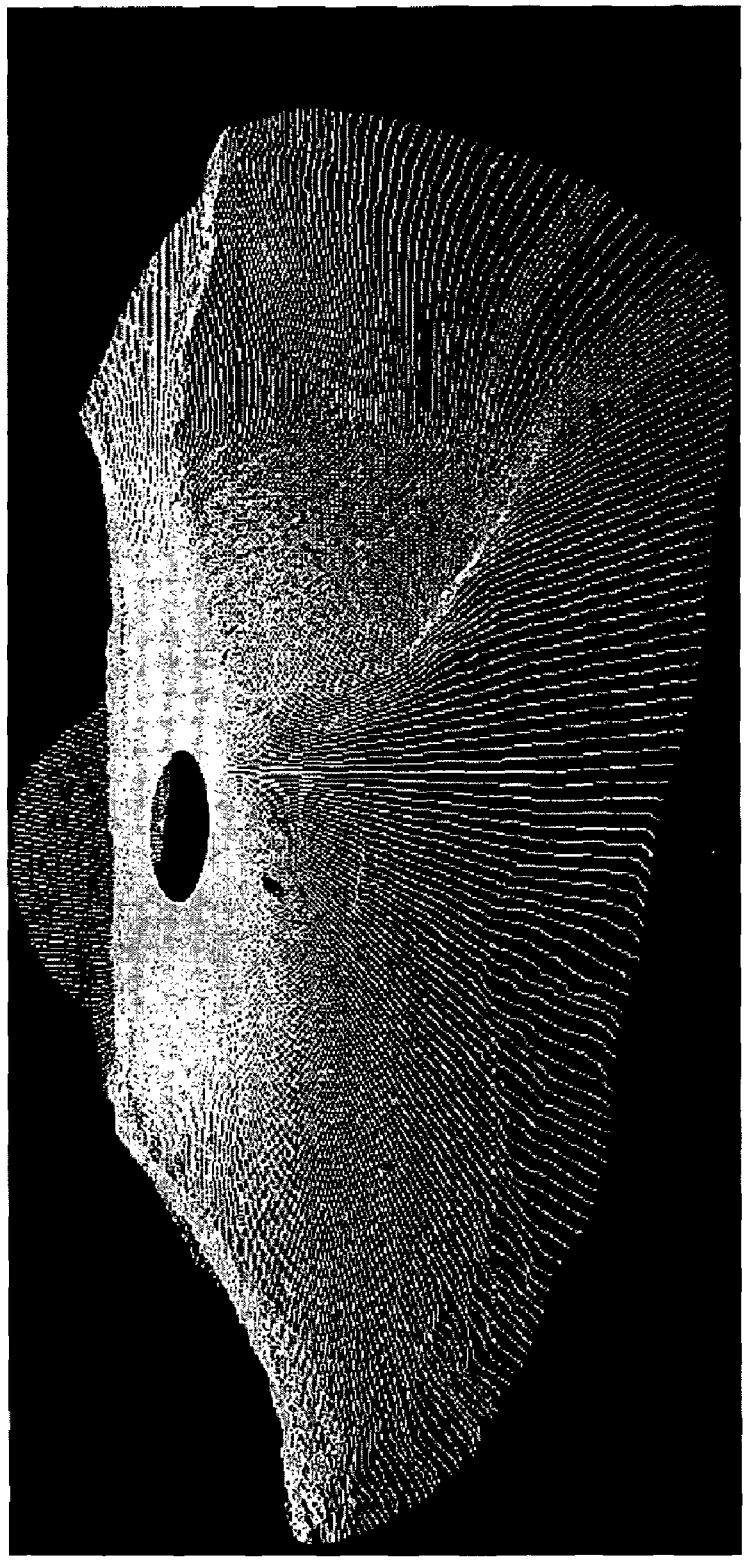
FIG. 16 is a 3D point cloud image with scan lines radiating from the centre.

When the above procedure is performed on every laser scanner data point in the calibration data a point cloud data set can be produced as shown in FIG. 16. This image shows the cloud point data in 3D. The altitude of each point is represented by colour (not shown). The individual scan lines can be easily seen in FIG. 16 radiating from the centre of the data. Note the hole at the centre of the data. This is the area covered by the dragline and also the area immediately adjacent to the dragline where the laser scanner's beam does not reach (due to its 60 degree field-of-view).

Figure 17:
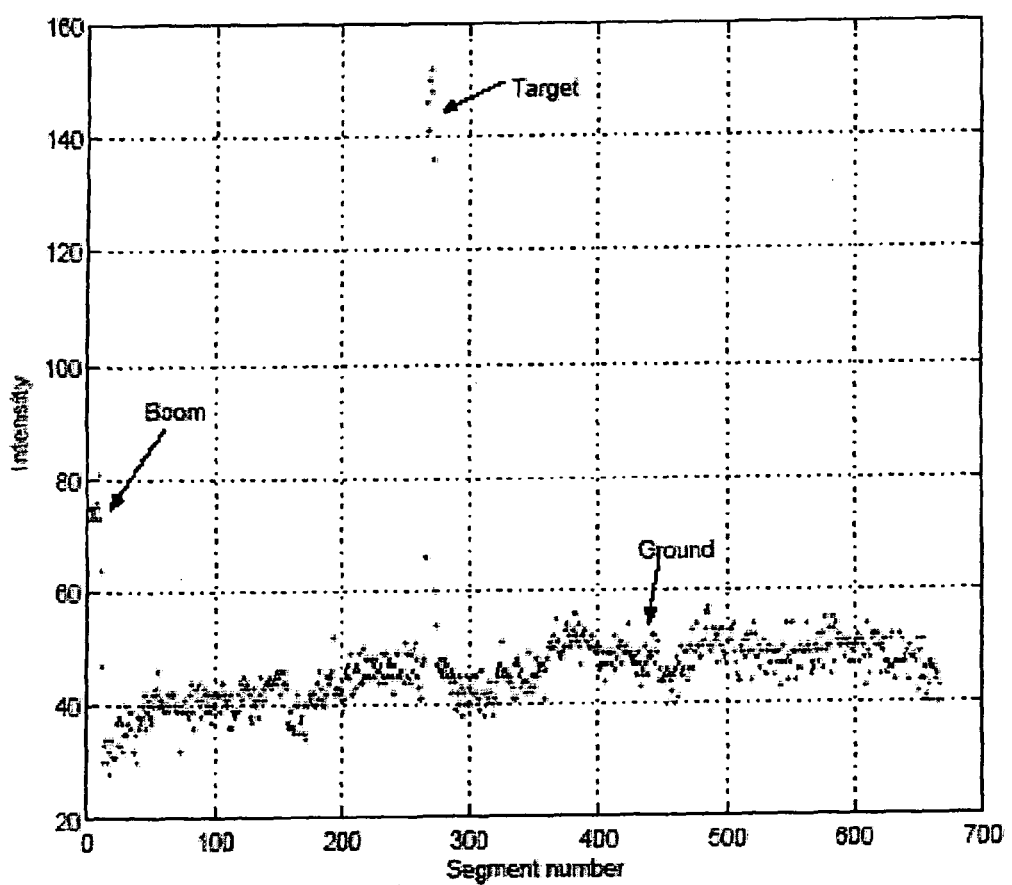
FIG. 17 is a plot of the intensity along a single laser scan containing a retro-reflective target.

It is critical that the survey targets can be automatically detected in the point cloud data. The survey targets used for the calibration consist of flat 40×40 cm retro-reflective plates attached to the top of a star-picket. The laser scanner returns an 8-bit (256 value) intensity value for each piece of data returned as well as the range and bearing. FIG. 17 shows the intensity plot from a single laser scan for a scan whose beam hit a target. It is clear from FIG. 17 that the targets stand out clearly from the ground. Note the boom reflections on the left of the figure (these are omitted in the analysis). The first stage of the target location procedure is therefore to threshold all points based on intensity. A value of 75 was used for this work, with all points having an intensity value over 75 being considered probable survey targets.

Figure 18:
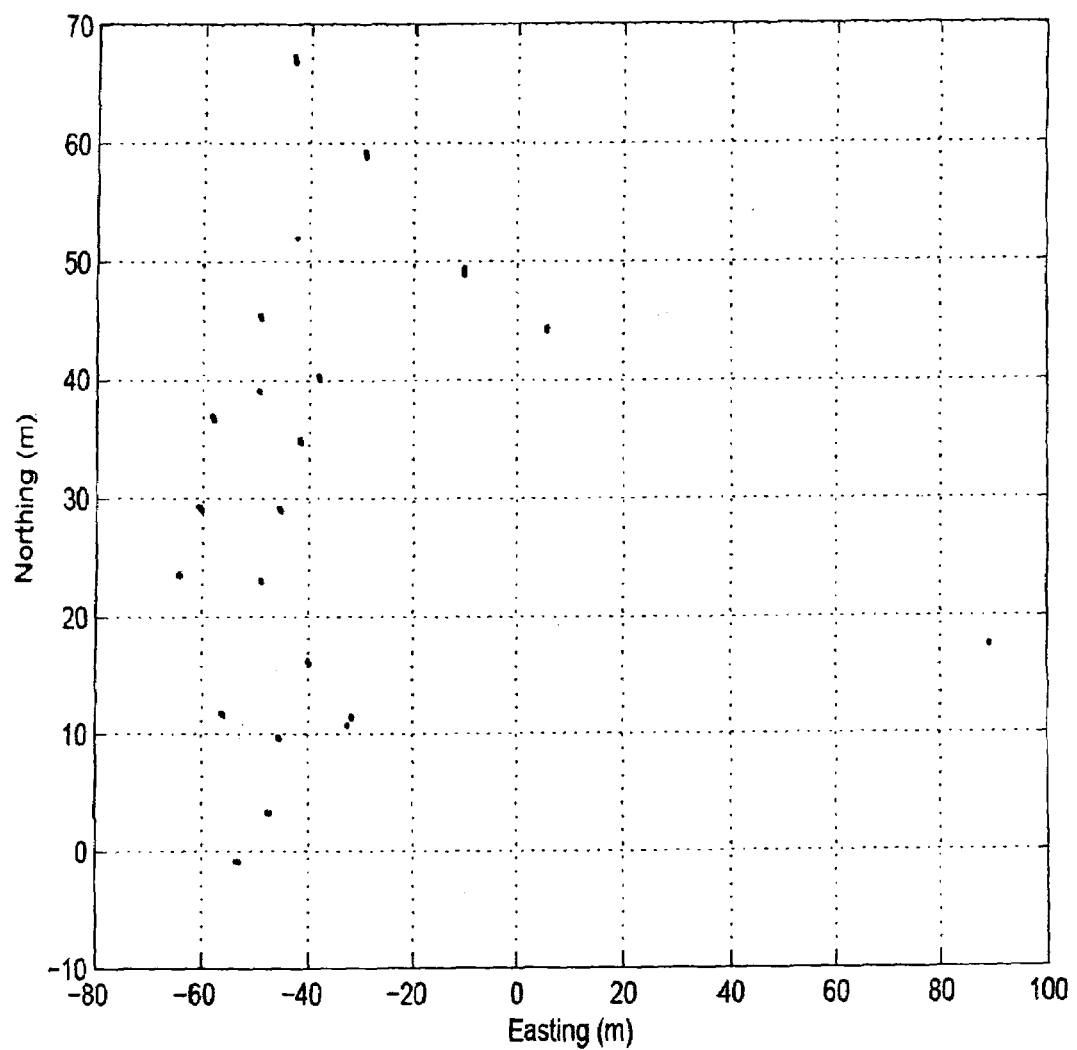
FIG. 18 is a plot of the 2D position of the target points and merged target centroids.

Each target may have a number of laser points associated with it. Adjacent target points are therefore identified with the centroid of the points being used as the location of each target. FIG. 18 shows the individual targets points and the merged target location (in two dimensions only for clarity). Note that in FIG. 18, 100 target points correspond to 19 possible targets and the adjacency threshold was set to 1 m (i.e. any points within 1 m of one another were considered to belong to the same target). Targets were also only considered valid if 3 or more points were associated with each. This constraint rejects outliers such as the point seen on the extreme right of FIG. 18 which is noise.

Figure 19:
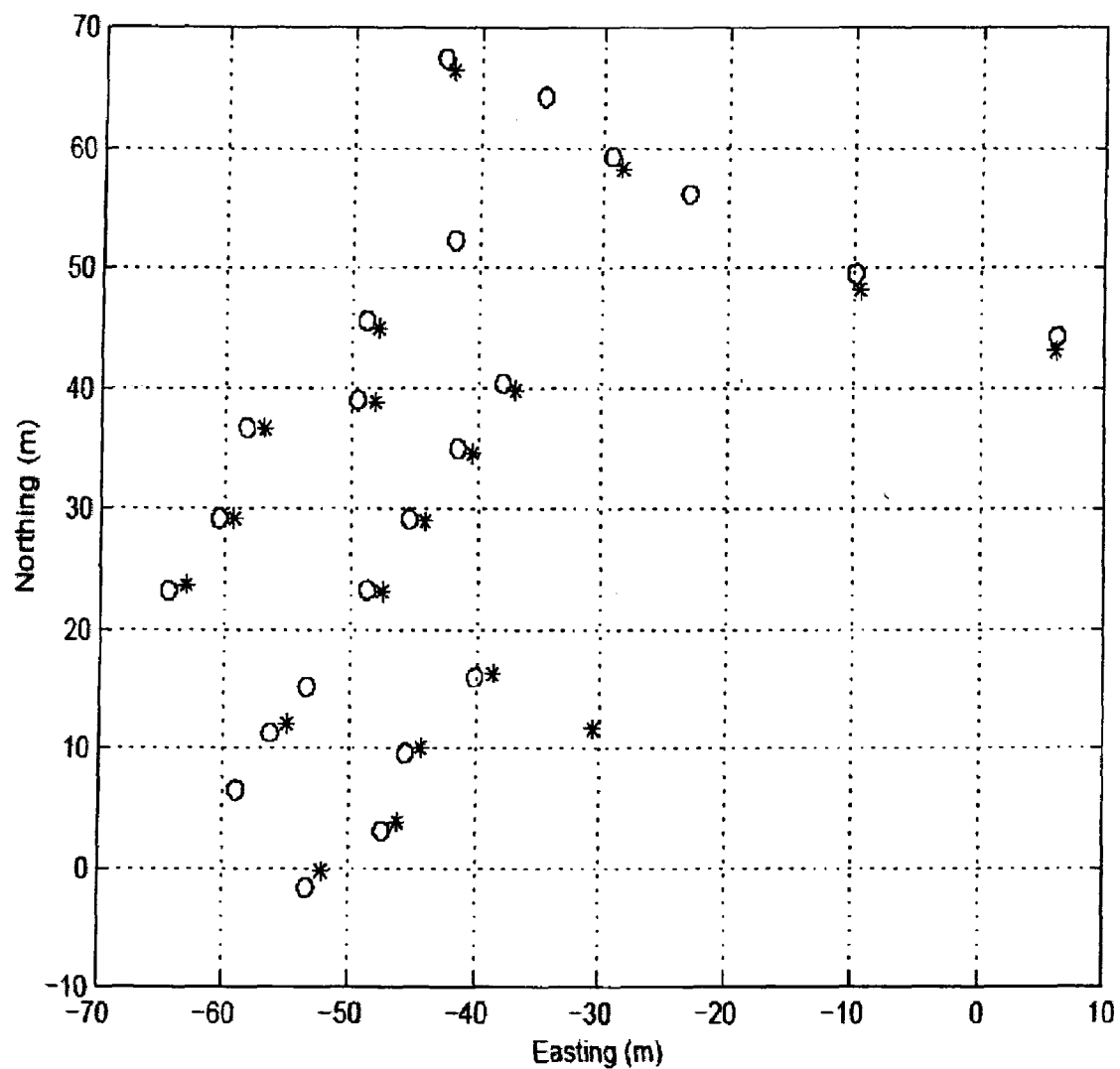
FIG. 19 is a plot of the 2D position of the survey posts as surveyed (circles) overlaid with the DTM system derived estimate of the position of the survey posts (stars).

The next step is to identify which target matches with which survey marker, the so-called correspondence problem. FIG. 19 shows the 2D position of the targets overlaid onto the survey map of the posts. The position of the targets shown in the figure were calculated using an initial guess (estimate) of the seven offset parameters. Points to note from FIG. 19 are:
  The initial guess is quite good, but not good enough with a typical error of over 1-2 m.
  Five of the survey markers have not been spotted by the laser scanning system.
  There is a "false positive" located at (−30,10) in the figure that does not correspond with a survey post. This actually corresponds with the roof of a parked vehicle.

The two data sets (survey and measured) are aligned using a data registration technique, such as the Iterative Closest Point (ICP) algorithm. The ICP algorithm is a commonly used technique used for data registration. At each iteration, it first creates closest point correspondences between two datasets and it then minimizes the average distance of the couplings by a rigid transformation. The ICP algorithm is terminated when the average distance falls below a certain threshold (0.2 m in this case). The result of the ICP algorithm is a transform that describes the spatial relationship between the two data sets (not used for the calibration process described in this document) and a list of the correspondences between the two data sets.

The final stage of the calibration process is that of optimisation. We must find the optimum values of the seven offsets that produce the most accurate position of the reflective markers when compared to the survey values. We have initial estimates of the offsets and can also estimate the range that the offsets can take. An exhaustive search optimisation will take too long since we have seven parameters so instead we have chosen to use an optimisation technique. The Genetic Algorithm (GA) is an example of an optimisation technique.

The success of optimisation, including a GA, is dependant on the fitness function used. Two fitness functions were tried. The first fitness function used was the standard Mean Squared Error (MSE) measure, $f_{mse}$. If the survey data is given by $(x_i^s, y_i^s, z_i^s)$ and the laser generated positions of the points by $(x_i^l, y_i^l, z_i^l)$ then the MSE fitness function is given by:

$$f_{mse} = \frac{\sum_{i=1}^{m}[(x_i^s - x_i^l)^2 + (y_i^s - y_i^l)^2 + (z_i^s - z_i^l)^2]}{m} \quad (15)$$

The second fitness function used was a Means Squared Error measure weighted according to the distance of each point from all other points. FIG. 19 shows that the posts are not uniformly spread around the dragline. The posts to the top and to the right of the figure are much further apart than the remainder and it is important that the errors from these posts are given significant weighting. The so-called Weighted Means Squared Error (WMSE) error $e_{wmse}$ fitness function was therefore developed. The WMSE fitness function is given by:

$$f_{wmse} = \frac{\sum_{i=1}^{m}\left[(x_i^s - x_i^l)^2 + (y_i^s - y_i^l)^2 + (z_i^s - z_i^l)^2\right]w_i}{\sum_{i=1}^{m} w_i} \quad (16)$$

where $w_i$ is given by $$w_i = \sum_{k=1}^{m} \sqrt{(x_i^l - x_k^l) + (y_i^l - y_k^l) + (z_i^l - z_k^l)} \quad (17)$$

and is the sum of the distances from point i to every other point found.

The type of GA used was a so-called "simple GA"[1]. The GAlib C++ library[2] was used to run the GAs. A simple GA uses non-overlapping populations and optional elitism, and creates an entirely new population of individuals each generation. The GA parameters used were as follows:

[1] David Edward Goldberg. *Genetic Algorithms in Search and Optimization*. Addison-Wesley Pub. Co., 1989.
[2] Matthew Wall. GAlib C++ library. http://lancet.mit.edu/ga/, 2000.

Population size: 100
  Number of populations: 200
  Crossover: 60%
  Mutation: 10%
  Genome: a 112-bit long bit string of the seven offset parameters each represented by 16-bits The values of the seven offset parameters were restricted to the range given in Table 1.

TABLE 1

Offset ranges used by the GA.

| Offset | Min | Max |
|---|---|---|
| X | −0.5 m | 0.5 m |
| Y | −0.5 m | 0.5 m |
| Z | −2.0 m | −0.5 m |

TABLE 1-continued

Offset ranges used by the GA.

| Offset | Min | Max |
| --- | --- | --- |
| Roll | 0.0 rad | 0.3 rad |
| Pitch | −0.06 rad | 0.06 rad |
| Yaw | −0.05 rad | 0.05 rad |
| Time Lag | 0.0 sec | 0.1 sec |

Figure 21:
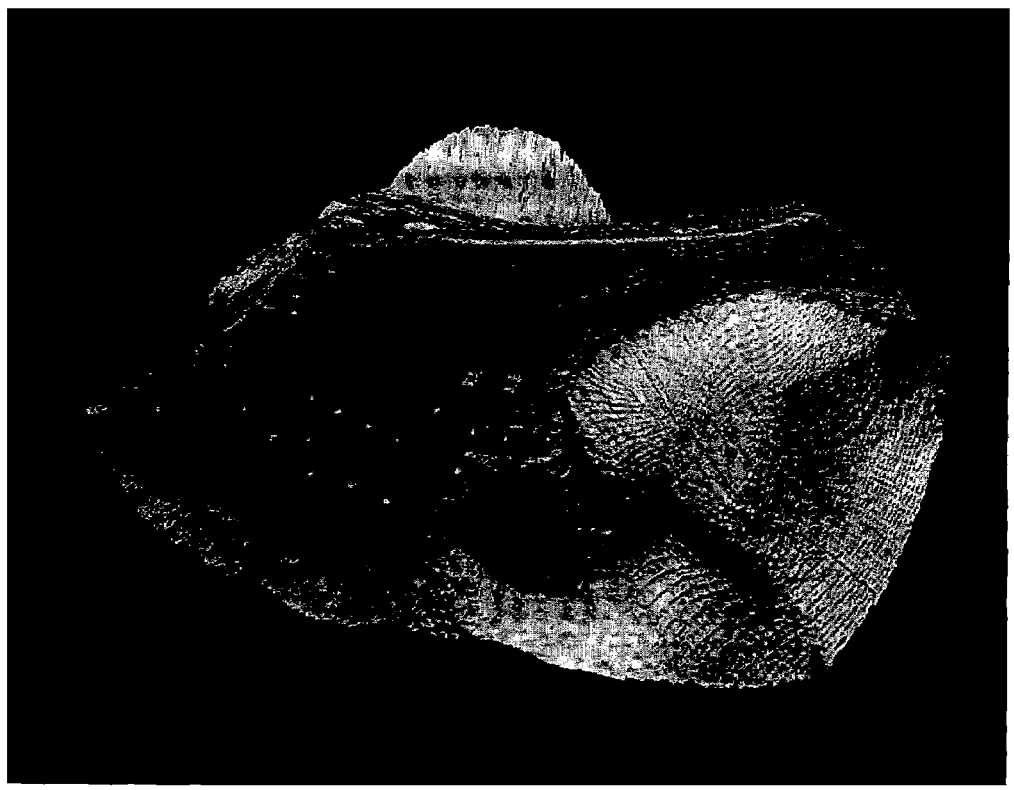
FIG. 21 is the final 3D image generated by the DTM system using the optimal offset parameters with the centre hole filled.

FIG. 20 shows the results of two GA runs using the $f_{mse}$ and $f_{wmse}$ fitness functions. It is clear from both this figure that the GA converges very quickly and produces offset values that result in Mean Squared Errors less than 0.2 m². From the figure it looks as though the $f_{mse}$ fitness function has performed the best (with a value of 0.165 compared to 0.182 of the $f_{wmse}$). However, this is not the case. If in the case of the $f_{wmse}$ if we calculate the $f_{mse}$ value for the same offset values we get a value for the Mean Squared Error of 0.158 m². Table 2 summarises the performance of the two GA runs. The result that really matters is the maximum error to a survey target which is 0.65 m for the $f_{wmse}$ generated offset values. Table 3 lists the offset values generated by the GA. Finally, FIG. 21 shows the DTM produced using the optimal offset values found by the GA.

TABLE 2

Summary of GA performance for the two fitness functions used.

| Fitness function | MSE (m²) | WMSE (m²) | Max error (m) |
| --- | --- | --- | --- |
| $f_{mse}$ | 0.17 | 0.19 | 0.71 |
| $f_{wmse}$ | 0.16 | 0.18 | 0.65 |

TABLE 3

Offset values found by the GA.

| Offset | Mix | Max | GA found |
| --- | --- | --- | --- |
| X | −0.5 m | 0.5 m | −0.326 m |
| Y | −0.5 m | 0.5 m | 0.126 m |
| Z | −2.0 m | −0.5 m | −1.629 m |
| Roll | 0.0 rad | 0.3 rad | 0.138 rad |
| Pitch | −0.06 rad | 0.06 rad | 0.033 rad |
| Yaw | −0.05 rad | 0.05 rad | 0.001 rad |
| Time lag | 0.0 sec | 0.1 sec | 0.025 sec |

The results show that it is possible to calibrate the boom tip mounted DTM scanning system using a calibration procedure involving survey the position of known retro-reflective targets. The calibration is necessary to estimate the values of seven unknown offset parameters (three distances, three angles and a time delay). We have shown that it is possible to use a Genetic Algorithm (GA) to estimate the values of the offset parameters. Of the 19 targets used we get a final worst case accuracy value of 0.65 m and a mean error of 0.4 m. The theoretically smallest error would could expect from the calibration experiment is 0.2 m. This is because this is the half-width of the targets used (which were 40×40 cm squares).

There are a number of ways in which it might be possible to improve the calibration procedure:

Slower rotation speed. The calibration data was collected from the dragline rotating at a speed of approximately 3 deg/s. The maximum speed of rotation for this dragline is about 6 deg/s. The speed of rotation resulted in only a single scan line hitting each calibration target. The position of the target as measured by the scanning system was taken as the centroid of the target data for that target in question. Most targets had associated with them a number of returned points, but these were all from the same scan and hence were all in a line. The position of the target can therefore only be determined with an accuracy of +/−0.2 m (since a target is 0.4 m wide). Collecting the data from the dragline while it is rotating more slowly should produce multiple scan lines across each target and hence improve the accuracy at which we can determine the centre of the target. Note that it is the centre of each target that was surveyed. Another way of achieving the same result would be to perform multiple rotations.

Better spread of targets. The calibration posts were predominately set out in a 90 degree quadrant around the dragline, with only two targets outside this area. This placement was due to location of the dragline on the day with respect to the accessible terrain and also the issue of other traffic being impeded by calibration posts. The ideal spread of targets would be to place them all around the dragline at as many different ranges as possible.

Better GPS signal. Choosing a day for calibration when there is no significant solar event which adversely effects the GPS signal.

Integrated GPS/Laser mount. The complexity of the calibration problem may be significantly reduced in the future by the design of an integrated GPS antenna/Laser scanner mount. The system currently installed consists of separate GPS antenna and laser scanner mounts. Three of the unknown offset parameters deal with issue (the three positional offsets are the distances in x, y and z between the centre of the GPS antenna and the centre of the laser scanner). If a combined mount was made with known distances between the antenna and laser scanner, then the calibration problem would be reduced to finding the value for four offset values (the three orientation angles and the time delay).

Although the invention has been described with reference to a particular example, it should be appreciated that it could be exemplified in many other forms and in combination with other features not mentioned above. For instance, many other mathematical procedures could be used besides those described.

The invention may also be applied to many other types of machinery besides draglines, including shovels, excavators, wheel loaders and cranes.

The invention claimed is:

1. A method for producing digital terrain maps of the vicinity around large rotating machinery, the method comprising the following steps:
    mounting a 2-Dimensions laser scanner and a high-accuracy RTK GPS system to an item of large rotating machinery, at a radial extremity of the machinery;
    arranging the laser scanner to record radial lines of data representing the terrain below the extremity of the machinery;
    rotating the machinery completely about its axis of rotation and generating data from both the laser scanner and GPS system that represents the terrain around the machinery;
    wherein, a calibration is conducted by recording data from markers at known locations in the terrain below the extremity of the machinery to determine the relative positions of the laser scanner centre and the GPS antenna, the orientation of the laser scanner and the time lag between the data generated from both the laser scanner and the GPS system.

2. The method according to claim 1, wherein seven offsets are determined by the calibration step, namely:
    the distance from the GPS antenna to laser scanner centre, that is x, y and z offsets, in total three values;

the installed roll, pitch and yaw angles of the laser scanner assembly with respect to the dragline, another three values; and, the time lag between the GPS and laser scanning sensors.

3. The method according to claim 1, wherein a number of calibrations are made to check system stability over time.

4. The method according to claim 3, wherein a plurality of markers are used for calibration, and the method includes the following steps:

placing a GPS antenna on top of each marker and recording the Easting, Northing and Altitude.

5. The method according to claim 4, including the step of aligning the 2D position of the marker as surveyed with the corresponding data estimated by the digital terrain mapping system using an Iterative Closest Point (ICP) algorithm.

6. The method according to claim 5, wherein the offsets determined by the calibration step are optimised.

7. The method according to claim 6, wherein optimisation uses a Genetic Algorithm.

8. The method according to claim 6, wherein optimisation uses a bundle adjustment.

9. The method according to claim 1, wherein data generated by both the laser scanner and GPS system while the machinery is rotated is time stamped.

10. The method according to claim 9, wherein the position of the GPS antenna is calculated at the time reported by the laser scanner.

11. A non-transitory computer readable medium having computer readable instructions for producing digital terrain maps of the vicinity around large rotating machinery, said instructions comprising:

arranging a 2-Dimensions laser scanner to record radial lines of data representing the terrain below the extremity of the machinery;

rotating the machinery completely about its axis of rotation and generating data from both the laser scanner and a high-accuracy RTK GPS system that represents the terrain around the machinery; and conducting a calibration by recording data from markers at known locations in the terrain below the extremity of the machinery to determine the relative positions of the laser scanner centre and the GPS antenna, the orientation of the laser scanner and the time lag between the data generated from both the laser scanner and the GPS system;

wherein the 2-Dimensions laser scanner and the high-accuracy RTK GPS system are mounted to an item of the large rotating machinery, at a radial extremity of the machinery.

12. The A non-transitory computer readable medium according to claim 11, further comprising instructions for providing a visualisation tool for an operator of the large rotating machinery, so that the operator may view the terrain around the machinery from any angle.

* * * * *